United States Patent
Nouveau et al.

[19]

[11] Patent Number: 6,152,170

[45] Date of Patent: Nov. 28, 2000

[54] DIFFERENTIAL RELIEF VALVE FOR FLEXIBLE SEA LINE

[75] Inventors: Joël Le Nouveau, Yainville; Pascal Retailleau, Marcq en Baroeul, both of France

[73] Assignee: Coflexip, Paris, France

[21] Appl. No.: 09/424,166

[22] PCT Filed: Apr. 20, 1999

[86] PCT No.: PCT/FR99/00936

§ 371 Date: Nov. 19, 1999

§ 102(e) Date: Nov. 19, 1999

[87] PCT Pub. No.: WO99/56045

PCT Pub. Date: Nov. 4, 1999

[30] Foreign Application Priority Data

Apr. 27, 1998 [FR] France .................................. 98 05260

[51] Int. Cl.[7] .................................................. F16K 15/00
[52] U.S. Cl. .................. 137/512; 137/538; 137/540; 137/613
[58] Field of Search .................................. 137/512, 538, 137/540, 613, 614.2, 614.21; 251/63, 63.5

[56] References Cited

U.S. PATENT DOCUMENTS

| | | | |
|---|---|---|---|
| 2,306,012 | 12/1942 | Campbell | 137/512 |
| 2,420,370 | 5/1947 | Hamilton | 137/53 |
| 2,724,239 | 11/1955 | Fox | 137/538 |
| 3,476,142 | 11/1969 | Schultz | 137/512 |
| 3,568,715 | 3/1971 | Taylor, Jr. | 137/613 |
| 3,749,121 | 7/1973 | Frankewich | 137/512.2 |
| 3,916,946 | 11/1975 | Motzer | 137/512 |
| 4,064,906 | 12/1977 | Berg | 137/529 |
| 4,185,946 | 1/1980 | Mitchell | 137/512 |
| 4,232,704 | 11/1980 | Becker et al. | 137/512 |
| 4,294,284 | 10/1981 | Herd | 137/613 |
| 5,168,895 | 12/1992 | Voss | 137/538 |
| 5,559,289 | 9/1996 | Brunson, IV et al. | 137/512 |

FOREIGN PATENT DOCUMENTS

| | | |
|---|---|---|
| 550957 | 6/1974 | Switzerland . |
| 2018399 | 10/1979 | United Kingdom . |

Primary Examiner—Gregory L. Huson
Assistant Examiner—Joanne Y. Kim
Attorney, Agent, or Firm—Ostrolenk, Faber, Gerb & Soffen, LLP

[57] ABSTRACT

Differential valve for a sub-sea flexible pipe having a valve body comprising an upper part communicating with the outside via at least one upper communication passage and a lower part communicating with at least one annulus of the flexible pipe via at least one communication duct, an internal chamber formed in the valve body and at a chamber pressure (Pc), a main clacker element mounted in the internal chamber and movable between a closed position and an open position, and urged toward the closed position by a first spring, a secondary clacker element mounted in the upper communication passage also movable between a closed position and an open position, the secondary clacker element being urged towards the closed position by a smaller pre-loaded spring, so that the pressure in the internal chamber is not below the exterior pressure (Pe) when the secondary clacker element is in the closed position.

12 Claims, 1 Drawing Sheet

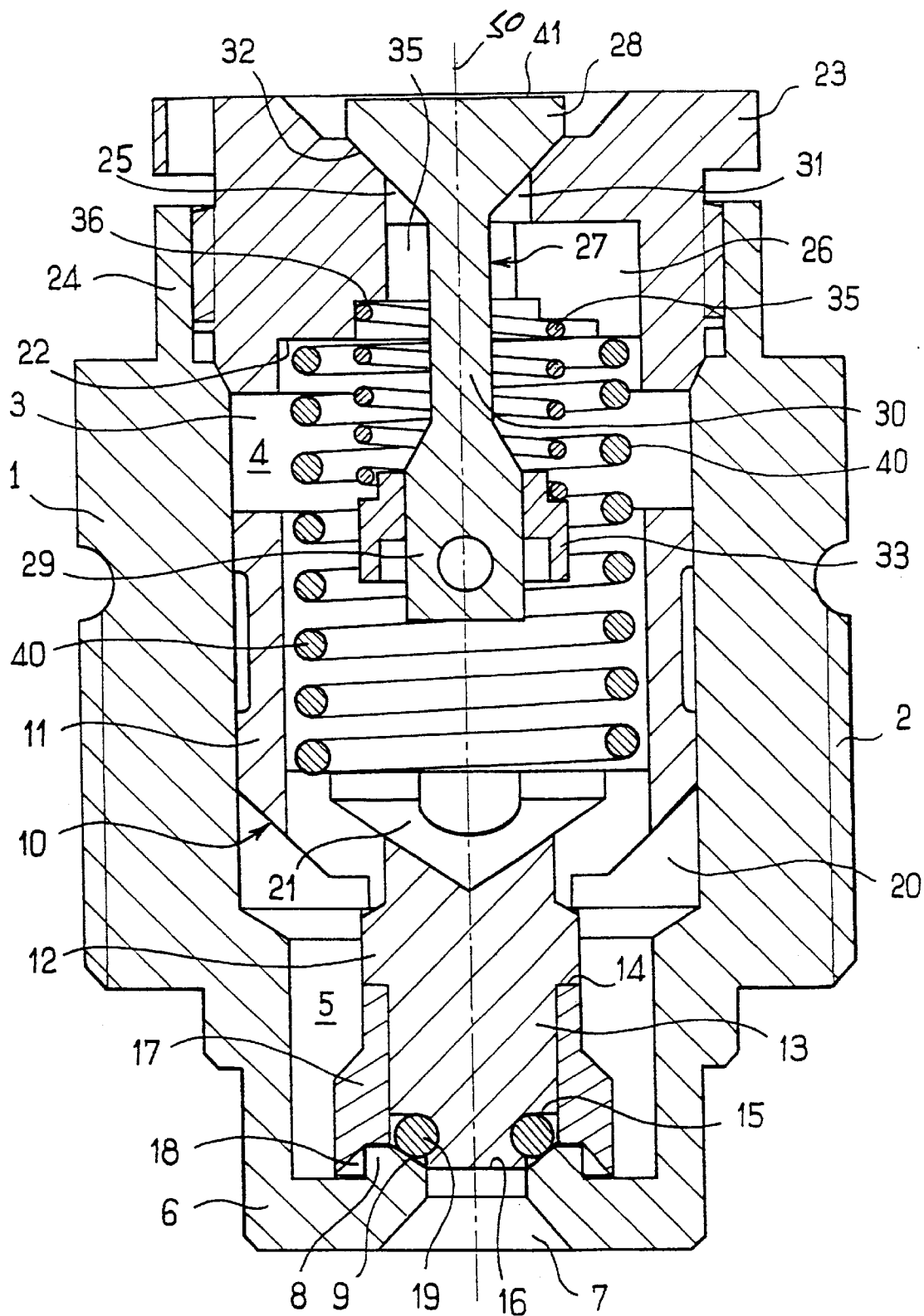

DIFFERENTIAL RELIEF VALVE FOR FLEXIBLE SEA LINE

BACKGROUND OF THE INVENTION

The present invention relates to a differential valve for a sub-sea flexible pipe and, more specifically, relates to a valve with two clacker elements capable of discharging gas, for example contained in a pressurized fluid flowing through the flexible pipe.

Flowing through flexible pipes used, in particular, in off-shore oil drilling, is a pressurized fluid which may contain gas which has to be discharged into the ambient surroundings. This gas generally diffuses into an annulus of the flexible pipe. To discharge the gas, it is usual for a drainage valve to be mounted at least at one of the ends, with one side of the valve communicating with at least the annulus whereas the other side communicates with the ambient surroundings which may be the atmosphere when the valve is mounted at that end of the pipe which is above the water surface, or seawater when the said valve is mounted near to the submerged end of the flexible pipe.

Such valves are intended to open as soon as the internal pressure obtaining in the annulus exceeds the pressure obtaining on the outside of the said flexible pipe by a certain amount, it being possible for this pressure difference to vary between 1 and 4 bar for example.

Among the valves used in sub-sea flexible pipes, mention may be made of valves comprising a two-part valve body into the bottom of which there open two passage ducts, a clacker element urged towards the closed position by a preloaded spring, a relatively broad and thick seal set into the lower end of the clacker element, and a flexible diaphragm in the shape of an annulus, the exterior periphery of which is trapped between the two parts of the valve body, and the interior periphery of which is trapped between two parts which make up the body of the clacker element. Two chambers, an upper one and a lower one, are therefore formed in the valve body, the said chambers being isolated from one another by the flexible and deformable diaphragm. The upper chamber of the valve is constantly filled with the ambient surroundings, air or water, which may or may not be laden with impurities in suspension.

When the impurities are not corrosive or not abrasive, the constituent elements are not attacked to any great extent and do not seize up too quickly. By contrast, when these impurities consist of sand, which is particularly the case when the valve is near the sea bed or the shoreline, then premature wear of the said constituent elements occurs, and some of these might even seize up, this sometimes causing the valve to stop working.

Another drawback of this type of valve lies in the fact that it is necessary to match the elements which have to cooperate with each other. This is because each of the constituent elements is manufactured with a certain tolerance. When two elements are matched it is essential that they be matched with the same manufacturing tolerance. Such matching is expensive because it necessarily means that there are elements which are not used.

SUMMARY OF THE INVENTION

The object of the present invention is to overcome the aforementioned drawbacks by proposing a differential valve which is reliable without the risk of damage to the constituent elements as the result of the ingress of corrosive and/or abrasive particles, and which does not require the constituent elements to be matched.

A subject of the present invention is a differential valve comprising the following parts:

A valve body comprises an upper part communicating with the outside via at least one upper communication passage and a lower part communicating with at least one annulus of the flexible pipe via at least one communication duct.

An internal chamber is formed in the valve body and has a chamber pressure $P_c$, A main clacker element is mounted in the internal chamber and is capable of occupying a closed position and an open position. The main clacker element is urged towards the closed position by a spring which is preloaded with a predetermined preload.

A secondary clacker element is aligned with and has the same axis of symmetry as the main clacker element. The secondary clacker element is mounted in the upper communication passage and is capable of occupying a closed position and an open position. The secondary clacker element is urged towards the closed position by a small preloaded spring, so that the pressure in the internal chamber $P_c$ is not below the exterior pressure $P_e$ when the secondary clacker element is in the closed position.

An advantage of the present invention lies in the fact that when the secondary clacker element is closed, after opening as a result of the opening of the main clacker element, the pressure $P_c$ obtaining in the internal chamber is higher than the exterior pressure $P_e$ obtaining in the ambient surroundings. This positive pressure difference $P_c - P_e$ prevents any ingress of solid particles into the internal chamber. Even while the secondary clacker element is closed, bubbles of gas are present under the head of the secondary clacker element, and this creates a barrier against the solid particles in suspension in the ambient surroundings. The presence of gas bubbles is also effective when the pressure $P_c$ is equal to the pressure $P_e$ because of the metal-to-metal contact of the secondary clacker element on its seat which means that the seal between the ambient surroundings and the internal chamber of the differential valve is not a perfect seal. Thus, the deposition of scale on the constituent elements of the valve, such as the main clacker element, the springs, etc. is greatly minimized.

BRIEF DESCRIPTION OF THE DRAWING

The drawing is a longitudinal section through a valve of the invention.

DESCRIPTION OF A PREFERRED EMBODIMENT

The differential valve with two clacker elements as depicted in the figure comprises a valve body 1 which has an external screw thread 2 so that it can be screwed onto a corresponding element of a flexible pipe, not depicted. Formed in the valve body 1 is an internal chamber 3 which may consist of two chambers, an upper chamber 4 and a lower chamber 5. The internal dimensions of the chambers may differ but they are in permanent communication.

Formed in the bottom 6 of the valve body 1 is a communication duct 7 which connects the lower chamber 5 to the inside of the flexible pipe or, more precisely, to the annulus of the said flexible pipe into which a gas that is to be discharged diffuses, the said gas being at a certain pressure denoted as the internal pressure $P_i$ and originating from the fluid flowing through the flexible pipe. Formed on a bearing surface 8 on the bottom 6 is a conical seat 9.

A main clacker element 10 is mounted in the valve body 1 and comprises an upper part 11, the outside diameter of which is roughly equal to the inside diameter of the upper chamber 4, but with enough tolerance to allow the clacker element to move vertically within the chamber 4. The lower part 12 of the main clacker element 10 comprises a small-diameter cylindrical part 13 delimited by an annular rim 14 and an annular groove 15 formed at the lower end 16. A deflector 17 is mounted securely on the cylindrical part 13 and comprises a skirt 18 which surrounds the part 8 of the bottom 6. An O-ring seal 19 is housed in the annular groove 15 and, when the main clacker element 10 is in the closed position, rests against the conical seat 9. As the deflector 17 rests on the part 8 whose diameter exceeds the cylindrical part of the communication duct 7, it follows that the O-ring seal 19 is not compressed beyond a certain extent for which it provides a perfect seal between the internal chamber 3 and the annulus of the flexible pipe into which the gas diffuses, and does so regardless of the difference $P_c$–$P_i$. Thus, premature wear of the O-ring seal 19 which could arise after a great many phases of opening and closing of the main clacker element 10 is avoided. Such a design of an O-ring seal 19 and of a conical seat 9 allows the lower end 16 and the conical seat to be manufactured with different manufacturing tolerances because there will always be sealed contact between the O-ring seal 19 and the conical seat 9, thus avoiding having to match the constituent elements. It is obvious that in place of the O-ring seal, it would be possible to use a flat seal fulfilling the same sealing function, provided that a corresponding seat were formed on the bearing surface 8 of the bottom 6 of the valve body 1. Preferably four passages 20 arranged at 90° from one another, and two of which are depicted in the figure are formed in the upper part 11 of the clacker element 10. A main spring 40 is prestressed with a preload of the order of 0.9 da.N in the embodiment depicted in the single figure. The main spring 40 is housed in the upper part 4 of the chamber 3, resting by one end on a piece 21 and by the other end on a shoulder 22 of a cover 23. The preload of the spring 40 and the cross-sectional area of the main clacker element 10 are determined such that the said clacker element 10 will close for a difference $P_c$–$P_i$ equal to 3 bar ±0.5 bar.

The cover 23 which is screwed into the upper part 24 of the valve body 1 comprises at least one central communication passage 25 which connects the inside of the internal chamber 3 with the outside ambient surroundings. Other communication passages 26, for example three of these arranged at 120° may also be provided in the cover 23.

A secondary clacker element 27 is mounted in alignment with the main clacker element 10 on the axis of symmetry 50 of the said clacker elements 10 and 27. The secondary clacker element comprises a cylindro-conical head 28 and a base 29 which are connected by a central shank 30 of smaller diameter, and is mounted in the central communication passage 25. The conical part 31 of the head 28 rests, in the closed position, on a conical secondary seat 32, the inclination of which is approximately 45°. As a preference, the length of the conical part 31 is very much greater than that of the conical seat 32 so that, among other things, on closure there will be certain contact between the clacker element head 28 and the conical seat 32. A fixed bearing piece 33 is fixed by a pin 34 to the base 29. A small secondary spring 35 urges the secondary clacker element 27 towards the closed position and rests by one end on the fixed resting piece 33 and by its other end on an interior shoulder 36 formed in the cover 23. The small secondary spring 35 is housed in the main spring 40, preferably concentrically. The preload on the secondary spring 27 is of the order of 0.3 da.N. Of course, it is possible to produce the head 28 of the secondary clacker element in the form of a flat head with a flat seat, but in such a way that a perfect seal is not obtained, so as to allow the passage of gas bubbles at a raised pressure compared with the pressure of the ambient surroundings. The secondary clacker element 27 opens and closes on the basis of the difference between the pressure $P_c$ obtaining in the chamber 26 and the external pressure $P_e$.

The way in which the valve according to the invention works is as follows.

As soon as the predetermined difference $\Delta P_1$ between the pressures $P_i$ and $P_c$ is equal to or greater than, for example, 3 bar ±0.5 bar, the main clacker element 10 opens. As soon as the main clacker element 10 opens, the secondary clacker element 27 opens because of the increase in the pressure obtaining in the chamber 3, the preload of 0.3 da.N and the stiffness of the spring 35 not being sufficient to prevent the said opening of the secondary clacker element 27. The gas entering the chamber 3 following the opening of the main clacker element 10 escapes into the ambient surroundings through the communication passages 25 and 26.

As soon as the pressure $P_c$ drops to a predetermined value, for example 300.2 bar for an exterior pressure $P_e$ equals 300 bar, the secondary clacker element 27 closes again, the secondary spring 35 returning it towards the closed position. As the secondary clacker element 27 does not seal onto its seat, gas bubbles form between the secondary clacker element 27 and the seat 32, so that the said bubbles constitute a barrier to the ingress of water or solid particles into the chamber 3. It is thus possible not only to avoid any deposition of scale but also to avoid damage to the constituent elements as a result of the action of the solid particles and/or of the water.

The main clacker element 10 remains open even after the secondary clacker element 27 has closed, as long as the difference $\Delta P_1$ in pressure between the internal pressure $P_i$ and the pressure $P_c$ in the chamber exceeds the preload and stiffness of the main spring 40. As soon as the difference $\Delta P_1$ drops to a certain value which is determined by the preloads and cross-sectional areas involved, the main clacker element 10 closes again, providing a sufficient seal by virtue of the O-ring seal.

In the example depicted, the following values have been chosen for a given geometry of the constituent elements of the differential valve according to the invention:

preload on the main spring $T_1$: 0.9 da.N, preload on the secondary spring $T_2$: 0.3 da.N, stiffness of the main spring $R_1$: 4 mm travel for a $\Delta f$ (difference in loading) of 0.7 da.N, stiffness of the secondary spring $R_2$: 4 mm travel for a $\Delta f$ (difference in loading) of 0.2 da.N, pressure difference $P_c$–$P_e$=$\Delta P_2$=0.2 bar, pressure difference $P_i$–$P_c$=3 bar±0.5 bar.

Of course, the above values can vary within a wide range.

The ratio $T_1/T_2$ is always above 1 and below 4 and the stiffness $R_2$ is lower than the stiffness $R_1$.

What is claimed is:

1. Differential valve for a sub-sea flexible pipe through which a fluid flows under an internal pressure (Pi) in the pipe, wherein the valve is subjected, on one side, to an exterior pressure (Pe) and, on another side, to the internal pressure (Pi) of the flexible pipe, valve comprising:

a valve body comprising an upper part at the exterior pressure having at least one upper communication passage communicating with the outside, and the valve body comprising a lower part having at least one communication duct communicating with at least one annulus of the flexible pipe, an internal chamber formed in the valve body and in which a chamber pressure (Pc) obtains, a main clacker element mounted in the internal chamber, the main clacker element is capable of moving between a closed position blocking communication and an open position opening communication, a main spring preloaded with a predetermined preload urges the main clacker element toward the closed position, a secondary clacker element coaxial with the main clacker element, a valve seat on which the second clacker element rests as it is urged outward toward the upper communication passage, a secondary spring preloaded with a preload which is lower than the preload on the main spring urges the secondary clacker element toward the valve seat, wherein the ratio of the preload of the main spring to the preload of the secondary spring is below 4, the secondary clacker element being urged to rest on the valve seat in a not sealed manner to allow the formation of bubbles of gas which define a barrier to the ingress of water or solid particles into the internal chamber.

2. Valve according to claim 1, further comprising a cover mounted at the upper part of the valve body and the cover includes the upper communication passage and the valve seat for the secondary clacker element.

3. Valve according to claim 2, wherein the secondary clacker element includes a head with an at least partially conical cross section and the head rests on the valve seat, a fixed piece secured to the lower part of the secondary clacker element, a second spring resting via one end of the spring on an interior shoulder formed on the cover and via the other end of the spring on the fixed piece mounted around the lower part of the secondary clacker element.

4. Valve according to claim 3 wherein the valve seat is conical, complementary to the head of the secondary clacker element.

5. Valve according to claim 4, wherein the preload on the secondary spring is approximately 0.3 da.N.

6. Valve according to claim 5, wherein the preload on the main spring is approximately a 0.9 da.N.

7. Valve according to claim 1, wherein the main seat has a conical part, and the seal is an O-ring seal which rests against the conical part of the main seat which is formed in the bottom of the valve body.

8. Valve according to claim 1, wherein the main clacker element comprises a clacker element body having a lower part at a deflector around and at least partially housing the cover part of the clacker element body.

9. Valve according to claim 1, wherein the secondary preloaded spring is housed inside the main spring.

10. Valve according to claim 1, wherein the preload on the main spring is approximately a 0.9 da.N.

11. Valve according to claim 1, wherein the secondary clacker element includes a flat head and the head of the secondary clacker element and the valve seat are flat.

12. Valve according to claim 1, further comprising a seal between the internal chamber and the outside, the seal being located between the lower part of the valve body and a main seat of the main clacker element.

* * * * *